(12) United States Patent
Harada et al.

(10) Patent No.: US 8,774,993 B2
(45) Date of Patent: Jul. 8, 2014

(54) HYBRID VEHICLE AND METHOD OF CONTROLLING THE SAME

(75) Inventors: Osamu Harada, Toyota (JP); Daigo Ando, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1018 days.

(21) Appl. No.: 12/311,788

(22) PCT Filed: Nov. 9, 2007

(86) PCT No.: PCT/JP2007/072247
§ 371 (c)(1),
(2), (4) Date: Apr. 14, 2009

(87) PCT Pub. No.: WO2008/059944
PCT Pub. Date: May 22, 2008

(65) Prior Publication Data
US 2010/0185349 A1    Jul. 22, 2010

(30) Foreign Application Priority Data
Nov. 15, 2006    (JP) .................................. 2006-309159

(51) Int. Cl.
*F01N 9/00*    (2006.01)
*B60K 13/00*    (2006.01)
*B60W 40/00*    (2006.01)

(52) U.S. Cl.
USPC ....... 701/22; 701/533; 180/65.21; 180/65.28; 60/272; 60/300; 903/903; 903/904; 903/930

(58) Field of Classification Search
CPC .......... B60K 13/00; B60L 3/00; B60L 11/00; B60L 2270/10; B60L 2270/12; B60W 20/00; B60W 40/00; F01N 9/00; F01N 11/00; G01C 22/00

USPC .......... 701/22, 36, 532, 533; 180/65.2, 65.21, 180/65.26, 65.28; 60/272, 274, 299, 300; 903/903, 904, 930
See application file for complete search history.

(56) References Cited

U.S. PATENT DOCUMENTS 5,785,137 A    7/1998 Reuyl
5,815,824 A    9/1998 Saga et al.
(Continued)

FOREIGN PATENT DOCUMENTS

EP    1 055 545 A2    11/2000
EP    1 707 430 A1    10/2006
(Continued)

OTHER PUBLICATIONS

Supplementary European Search Report issued in Application No. 07831977.9; Date Apr. 1, 2011.

*Primary Examiner* — Adam Tissot
(74) *Attorney, Agent, or Firm* — Oliff PLC

(57) ABSTRACT

A hybrid vehicle is equipped with an engine and a motor generator (MG2) serving as a power source for driving the vehicle. A catalytic converter is provided in an exhaust pipe of the engine. An HV-ECU estimates a possible EV-running distance based on an SOC of a power storage device for comparison with a traveling distance (L) to a destination set by a navigation device. When the possible EV-running distance is longer than the traveling distance (L), the HV-ECU outputs a control signal (CTL2) instructing prohibition of warm-up of the catalytic converter, to an EG-ECU.

21 Claims, 9 Drawing Sheets

(56) References Cited

U.S. PATENT DOCUMENTS

| | | |
|---|---|---|
| 2003/0015358 A1 | 1/2003 | Abe et al. |
| 2006/0180362 A1* | 8/2006 | Yamaguchi et al. ......... 180/65.2 |
| 2007/0029121 A1* | 2/2007 | Saitou et al. ................. 180/65.2 |

FOREIGN PATENT DOCUMENTS

| | | |
|---|---|---|
| EP | 1707430 A1 * | 10/2006 |
| JP | A-06-165308 | 6/1994 |
| JP | A-08-237810 | 9/1996 |
| JP | A-2001-069610 | 3/2001 |
| JP | A-2002-343401 | 11/2002 |
| JP | A-2003-032807 | 1/2003 |
| JP | A-2003-153402 | 5/2003 |
| JP | A-2003-269208 | 9/2003 |
| JP | A-2004-007969 | 1/2004 |
| JP | A-2004-162534 | 6/2004 |
| JP | A-2005-146910 | 6/2005 |
| WO | WO 2005/012023 A1 | 2/2005 |
| WO | WO 2005012023 A1 * | 2/2005 |
| WO | WO 2005/068245 A1 | 7/2005 |

* cited by examiner

HYBRID VEHICLE AND METHOD OF CONTROLLING THE SAME

TECHNICAL FIELD

The present invention relates to a hybrid vehicle equipped with an internal combustion engine and an electric motor as a power source for driving the vehicle, and also relates to a method of controlling the same.

BACKGROUND ART

Hybrid vehicles are receiving attention as environmentally friendly vehicles. A hybrid vehicle is equipped with, not only a conventional engine, but also a power storage device, an inverter and a motor driven by the inverter, as power sources for driving the vehicle.

Similarly to conventional vehicles having the engine as the only power source, a hybrid vehicle, also equipped with the engine, generally has mounted thereon a catalytic converter for purifying the exhaust gas discharged from the engine.

Japanese Patent Laying-Open No. 2003-269208 discloses a control apparatus for a hybrid vehicle equipped with a catalytic converter. When the SOC (State of Charge) of a battery drops to its lower limit or below, the control apparatus starts the engine for charging the battery. When the battery SOC reaches a set value larger than the above-mentioned lower limit, the control apparatus preheats the engine, the catalytic converter and the like.

According to this control apparatus, the engine, the catalytic converter and the like have already been warmed up when the engine is started. This can prevent degradation in emission characteristics.

However, with the control apparatus disclosed in the above publication, the engine, the catalytic converter and the like may be warmed up even when the vehicle can reach a destination in a traveling mode of traveling only by means of the motor without operating the engine (hereinafter also referred to as an "EV mode"). This may result in increased fuel consumption.

Particularly in a hybrid vehicle whose power storage device is rechargeable from a power source external to the vehicle (e.g., a system power source), the traveling distance in the EV mode, conventionally being as short as several kilometers, for example, has been extended to 10 km or longer. Accordingly, the EV mode traveling may occupy a substantial part of traveling. It is therefore considered that the aforementioned problem will occur significantly.

DISCLOSURE OF THE INVENTION

The present invention has therefore been made to solve the above problems. An object of the invention is to provide a hybrid vehicle which prevents unnecessary warm-up of a catalytic converter to avoid increase in fuel consumption.

Another object of the present invention is to provide a method of controlling a hybrid vehicle which prevents unnecessary warm-up of a catalytic converter to avoid increase in fuel consumption.

According to the present invention, a hybrid vehicle equipped with an internal combustion engine and an electric motor serving as a power source for driving the hybrid vehicle includes a catalytic converter, a warming-up unit, a setting unit, an estimation unit, a comparison unit, and a control unit. The catalytic converter purifies an exhaust gas discharged from the internal combustion engine. The warming-up unit warms up the catalytic converter. The setting unit sets a traveling distance of the hybrid vehicle. The estimation unit estimates a possible running distance in an electric-motor traveling mode of traveling with the internal combustion engine turned off and with the electric motor driven, based on a state of charge (SOC) of a power storage device supplying electric power to the electric motor. The comparison unit compares the possible running distance estimated by the estimation unit with the traveling distance set by the setting unit. The control unit controls the warming-up unit based on a result of the comparison made by the comparison unit.

Preferably, when the possible running distance estimated by the estimation unit is longer than the traveling distance set by the setting unit, the control unit prohibits warm-up of the catalytic converter by the warming-up unit.

Further preferably, when start of the internal combustion engine is requested during prohibition of warm-up of the catalytic converter, the control unit cancels the prohibition of warm-up of the catalytic converter by the warming-up unit.

Preferably, when the traveling distance of the hybrid vehicle is newly set by the setting unit, the comparison unit compares the newly set traveling distance with the possible running distance estimated by the estimation unit. The control unit controls the warming-up unit based on the result of the comparison.

Preferably, when the traveling distance of the hybrid vehicle is newly set by the setting unit during warm-up of the catalytic converter, the comparison unit compares the newly set traveling distance with the possible running distance estimated by the estimation unit. When the possible running distance estimated by the estimation unit is longer than the newly set traveling distance, the control unit stops warm-up of the catalytic converter by the warming-up unit.

Preferably, when a system of the hybrid vehicle is turned off at a distance shorter than the traveling distance set by the setting unit, the comparison unit compares a remaining distance of the set traveling distance with the possible running distance estimated by the estimation unit when the system is activated next time. The control unit controls the warming-up unit based on the result of the comparison.

Preferably, the hybrid vehicle further includes a power generation unit and a threshold-value setting unit. The power generation unit generates electric power for charging the power storage device using motive power of the internal combustion engine. The internal combustion engine is started when the state of charge (SOC) of the power storage device falls below a predetermined threshold value. The threshold-value setting unit sets the predetermined threshold value at a first threshold value when the possible running distance estimated by the estimation unit is longer than the traveling distance set by the setting unit. The threshold-value setting unit sets the predetermined threshold value at a second threshold value larger than the first threshold value when the possible running distance estimated by the estimation unit is not longer than the traveling distance set by the setting unit.

Preferably, the hybrid vehicle further includes a charging unit charging the power storage device by electric power received from a source external to the hybrid vehicle.

Preferably, the setting unit includes a navigation device allowing setting of a destination of the hybrid vehicle. The navigation device calculates the traveling distance of the hybrid vehicle based on the set destination.

Preferably, the setting unit includes an input device allowing input of the traveling distance of the hybrid vehicle.

Preferably, the setting unit sets the traveling distance of the hybrid vehicle at a preset fixed value.

The present invention is also directed to a method of controlling a hybrid vehicle equipped with an internal combustion engine and an electric motor serving as a power source for driving the hybrid vehicle. The hybrid vehicle includes a catalytic converter purifying an exhaust gas discharged from the internal combustion engine, and a warming-up unit warming up the catalytic converter. The method includes first to fifth steps. At the first step, a traveling distance of the hybrid vehicle is set. At the second step, a state of charge (SOC) of a power storage device supplying electric power to the electric motor is estimated. At the third step, a possible running distance in an electric-motor traveling mode of traveling with the internal combustion engine turned off and with the electric motor driven is estimated, based on the estimated state of charge. At the fourth step, the estimated possible running distance is compared with the traveling distance set in the first step. At the fifth step, the warming-up unit is controlled based on a result of the comparison.

Preferably, the hybrid vehicle further includes a power generation unit generating electric power for charging the power storage device by motive power of the internal combustion engine. The internal combustion engine is started when the state of charge (SOC) of the power storage device falls below a predetermined threshold value. The method further includes sixth and seventh steps. At the sixth step, the predetermined threshold value is set at a first threshold value when the possible running distance estimated in the third step is longer than the traveling distance set in the first step. At the seventh step, the predetermined threshold value is set at a second threshold value larger than the first threshold value, when the possible running distance estimated in the third step is not longer than the traveling distance set in the first step.

According to the present invention, a possible running distance in the electric-motor traveling mode is estimated based on the SOC of the power storage device. The estimated possible running distance is compared with a traveling distance of the vehicle having been set. The warming-up unit for warming up the catalytic converter is controlled based on the result of the comparison. Accordingly, when the vehicle can travel the set traveling distance only in the electric-motor traveling mode, warm-up of the catalytic converter subject to operation of the internal combustion engine can be prevented.

The present invention can therefore prevent unnecessary warm-up of the catalytic converter to avoid increase in fuel consumption.

BEST MODES FOR CARRYING OUT THE INVENTION

Figure 1:
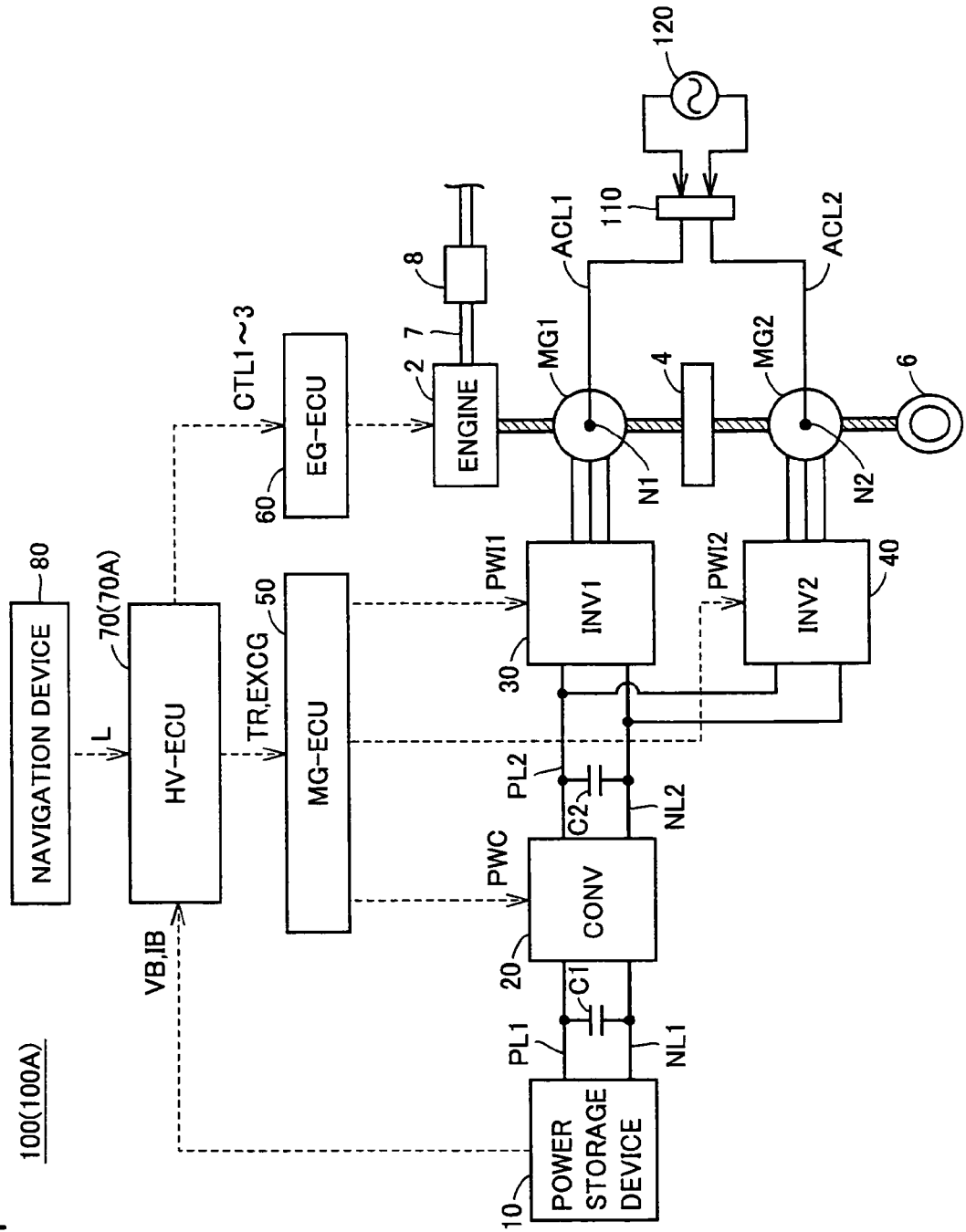
FIG. 1 is an overall block diagram of a hybrid vehicle according to a first embodiment of the present invention.

In the following description, embodiments of the present invention will be described in detail with reference to the drawings. Like or corresponding parts in the drawings will be denoted by like reference numerals, and description thereof will not be repeated.

First Embodiment

FIG. 1 is an overall block diagram of a hybrid vehicle according to a first embodiment of the present invention. Referring to FIG. 1, a hybrid vehicle 100 includes an engine 2, an exhaust pipe 7, a catalytic converter 8, motor generators MG1 and MG2, a power split mechanism 4 and a wheel 6. Hybrid vehicle 100 also includes a power storage device 10, a boost converter 20, inverters 30 and 40, positive electrode lines PL1 and PL2, negative electrode lines NL1 and NL2, capacitors C1 and C2, electric power lines ACL1 and ACL2, and a connector 110. Hybrid vehicle 100 further includes an MG-ECU (Electric Control Unit) 50, an EG-ECU 60, an HV-ECU 70 and a navigation device 80.

This hybrid vehicle 100 runs with engine 2 and motor generator MG2 as power sources. Power split mechanism 4 is coupled to engine 2 and motor generators MG1, MG2 to distribute motive power among them. For example, as power split mechanism 4, a planetary gear mechanism having three rotation shafts of a sun gear, a planetary carrier and a ring gear can be used. These three rotation shafts are connected to the rotation shafts of engine 2, motor generator MG1, and motor generator MG2, respectively. For example, providing a crankshaft of engine 2 to extend through the center of a rotor of motor generator MG1, the rotor being hollow, establishes mechanical connection of engine 2 and motor generators MG1, MG2 to power split mechanism 4. Motor generator MG2 has its rotation shaft coupled to wheel 6 via a reduction gear and a differential gear not shown.

Motor generator MG1 is incorporated in hybrid vehicle 100 to operate as a power generator driven by engine 2 and as an electric motor that can start engine 2. Motor generator MG2 is incorporated in hybrid vehicle 100 as an electric motor for driving wheel 6.

Catalytic converter 8 is provided in exhaust pipe 7 for purifying a hazardous component of exhaust gas discharged from engine 2. In catalytic converter 8, a catalyst is not sufficiently activated at low temperatures, which in turn fails to fully exert its function of purifying the exhaust gas. Therefore, to cause catalytic converter 8 to function satisfactorily, catalytic converter 8 needs to be warmed up.

Power storage device 10 is a rechargeable dc power source, and implemented, for example, by a nickel metal hydride, lithium ion or a similar secondary battery. Power storage device 10 is connected to boost converter 20 via positive electrode line PL1 and negative electrode line NL1. Power storage device 10 includes a voltage sensor and a current sensor not shown to output detected values of a voltage VB between terminals of power storage device 10 and a charging/discharging current IB, to HV-ECU 70. Power storage device 10 may be implemented by an electric double layer capacitor.

Boost converter 20 is provided between positive and negative electrode lines PL1, NL1, and positive and negative electrode lines PL2, NL2. Boost converter 20 carries out voltage conversion between positive electrode line PL1 and positive electrode line PL2, based on a driving signal PWC received from MG-ECU 50. Boost converter 20 is comprised of, for example, a chopper circuit of the up-conversion/down-conversion type.

Capacitor C1 is connected between positive electrode line PL1 and negative electrode line NL1 for smoothing voltage variations between positive electrode line PL1 and negative electrode line NL1. Capacitor C2 is connected between positive electrode line PL2 and negative electrode line NL2 for smoothing voltage variations between positive electrode line PL2 and negative electrode line NL2.

Inverters 30 and 40 are connected in parallel to each other to positive electrode line PL2 and negative electrode line NL2. Inverter 30 drives motor generator MG1 in power running or in regeneration based on a driving signal PWI1 received from MG-ECU 50. Inverter 40 drives motor generator MG2 in power running or in regeneration based on a driving signal PWI2 received from MG-ECU 50. Inverters 30 and 40 are each formed of a bridging circuit including three-phase switching devices.

When power storage device 10 is charged from a power source 120 external to the vehicle connected to connector 110, inverters 30 and 40 convert electric power received at neutral points N1 and N2 from power source 120 via electric power lines ACL1 and ACL2, respectively, into dc power based on driving signals PWI1 and PWI2 received from MG-ECU 50, to output the converted dc power to positive electrode line PL2.

Motor generators MG1 and MG2 are three-phase ac rotating machines, each being formed of a three-phase ac synchronous motor having a rotor with a permanent magnet embedded therein. Motor generator MG1 is driven in a regeneration operation by inverter 30 to output a three-phase ac voltage generated using motive power of engine 2, to inverter 30. At the start of engine 2, motor generator MG1 is driven in power running by inverter 30 to crank engine 2. Motor generator MG2 is driven in power running by inverter 40 to generate driving force for driving wheel 6. During regenerative breaking of the vehicle, motor generator MG2 is driven in a regeneration operation by inverter 40 to output a three-phase ac voltage generated using rotational force received from wheel 6, to inverter 40.

MG-ECU 50 generates driving signal PWC for driving boost converter 20, and driving signals PWI1 and PWI2 for driving inverters 30 and 40, respectively, based on torque command values TR for the respective motor generators received from HV-ECU 70, signals received from sensors not shown, traveling condition, accelerator pedal position and the like, to output generated driving signals PWC, PWI1 and PWI2 to boost converter 20, inverter 30 and inverter 40, respectively.

Upon receipt of an external charge command EXCG from HV-ECU 70, MG-ECU 50 generates driving signals PWI1 and PWI2 for driving inverters 30 and 40, respectively, such that ac power received at neutral points N1 and N2 from power source 120 via electric power lines ACL1 and ACL2, respectively, is converted into dc power for output to positive electrode line PL2. More specifically, MG-ECU 50 exerts control to simultaneously switch on/off the respective phase arms in each of inverters 30 and 40, in accordance with ac power inputs received at neutral points N1 and N2, respectively. This causes inverters 30, 40 and coils of motor generators MG1 and MG2 to function as a single-phase PWM converter.

EG-ECU 60 controls engine 2 based on the status of an ignition key, accelerator pedal position, vehicle speed and the like. Upon receipt of a control signal CTL1 from HV-ECU 70, EG-ECU 60 exerts control for warming up catalytic converter 8 (hereinafter also referred to as "warm-up control"). More specifically, EG-ECU 60 starts engine 2 to retard opening and closing timing of an intake valve for operating engine 2. Accordingly, catalytic converter 8 is warmed up by the heat of exhaust gas discharged from engine 2. Upon receipt of a control signal CTL2 from HV-ECU 70, EG-ECU 60 prohibits warm-up control of catalytic converter 8, or stops warm-up control while warm-up control is being exerted. Upon receipt of a control signal CTL3 from HV-ECU 70, EG-ECU 60 exerts control to drive engine 2 according to a received control command.

HV-ECU 70 generates control commands necessary for exerting control to drive motor generators MG1, MG2 and engine 2 to output the generated control commands to MG-ECU 50 and EG-ECU 60.

HV-ECU 70 receives a traveling distance L from the current position to a destination, from navigation device 80. HV-ECU 70 determines, by the following method, whether or not traveling distance L can be traveled in an EV mode of traveling only by means of motor generator MG2 with engine 2 turned off (traveling in the EV mode will hereinafter also be referred to as "EV traveling"). Upon determination that traveling distance L can be traveled in the EV mode, HV-ECU 70 outputs control signal CTL2 to EG-ECU 60. In other words, upon determination that traveling distance L to the destination can be traveled by EV traveling, HV-ECU 70 prohibits warm-up of catalytic converter 8, or stops warm-up of catalytic converter 8 during warm-up control.

When the start of engine 2 is requested according to the vehicle traveling condition or SOC decrease of power storage device 10, HV-ECU 70 deactivates control signal CTL2. In other words, when the start of engine 2 is requested, HV-ECU 70 cancels the prohibition or stop of warm-up of catalytic converter 8.

Navigation device 80 detects the current position of hybrid vehicle 100 by means of a GPS (Global Positioning System) antenna, a ROM (Read Only Memory) with map data stored thereon, and the like. Navigation device 80 has a destination setting function. When a user sets a destination, navigation device 80 outputs the setting to HV-ECU 70, and calculates traveling distance L from the current position to the destination for output to HV-ECU 70. When the user newly sets (or changes) the destination, navigation device 80 also outputs the new setting (or change) and traveling distance L to the destination, to HV-ECU 70.

Alternatively, navigation device 80 may be configured such that traveling distance L can be set directly, instead of setting a destination. As another alternative, navigation device 80 may be replaced by an input device allowing input of traveling distance L. Further, traveling distance L may be set at a preset fixed value.

Figure 2:
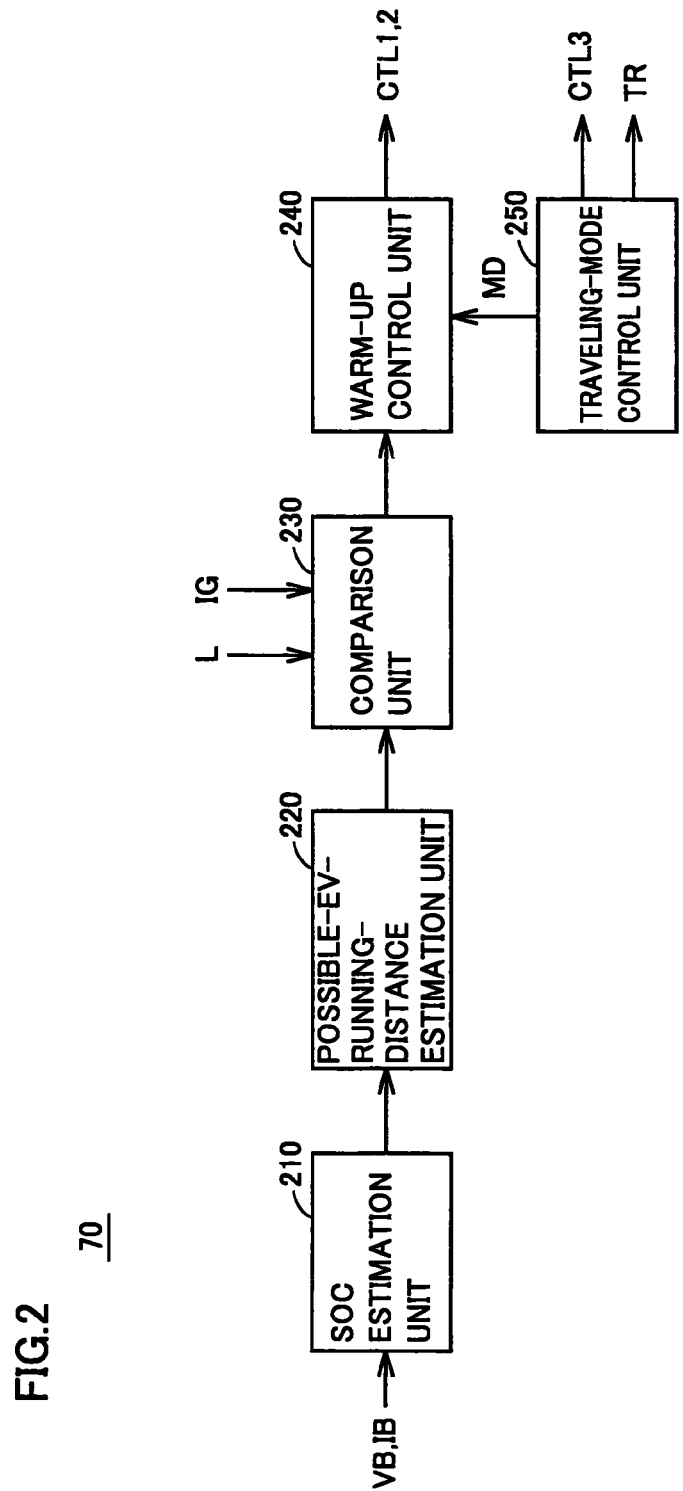
FIG. 2 is a functional block diagram of an HV-ECU shown in FIG. 1.

FIG. 2 is a functional block diagram of HV-ECU 70 shown in FIG. 1. Referring to FIG. 2, HV-ECU 70 includes an SOC estimation unit 210, a possible-EV-running-distance estimation unit 220, a comparison unit 230, a warm-up control unit 240 and a traveling-mode control unit 250.

SOC estimation unit 210 estimates the SOC of power storage device 10 based on detected values of voltage VB and current D3 of power storage device 10. Various publicly-known techniques can be used for estimating the SOC of power storage device 10.

Possible-EV-running-distance estimation unit 220 estimates a possible running distance in the EV mode based on the SOC of power storage device 10. For example, possible-EV-running-distance estimation unit 220 can estimate a possible running distance in the EV mode based on the amount of energy obtained from the SOC of power storage device 10 and the amount of energy required to travel a unit distance only by means of motor generator MG2. Possible-EV-running-distance estimation unit 220 may obtain information on the gradient of a route to the destination, from navigation device 80, to estimate the possible EV-running distance taking into consideration the amount of regenerative energy returned to power storage device 10.

Comparison unit 230 obtains traveling distance L to the destination from navigation device 80, to compare the possible EV-running distance estimated possible-EV-running-distance estimation unit 220 with traveling distance L. When a signal IG indicative of the activated state of the vehicle system is changed from OFF to ON, in other words, when the vehicle system is activated, comparison unit 230 obtains a remaining traveling distance to the destination from navigation device 80 as traveling distance L, to compare a possible EV-running distance newly estimated by possible-EV-running-distance estimation unit 220 with traveling distance L. Comparison unit 230 then outputs a result of the comparison between the possible EV-running distance and traveling distance L, to warm-up control unit 240.

Warm-up control unit 240 exerts control to prohibit (or stop) warm-up control performed by EG-ECU 60 and to cancel the prohibition (or stop). More specifically, upon receipt of the result of the comparison that the possible EV-running distance is longer than traveling distance L from comparison unit 230, warm-up control unit 240 outputs control signal CTL2 instructing prohibition or stop of warm up of catalytic converter 8, to EG-ECU 60. Upon receipt of a result of the comparison opposite to the above from comparison unit 230, warm-up control unit 240 deactivates control signal CTL2.

Warm-up control unit 240 also receives a mode signal MD indicative of a current traveling mode from traveling-mode control unit 250. When the traveling mode is in the HV mode (traveling mode of traveling with engine 2 operated), warm-up control unit 240 deactivates control signal CTL2. In other words, when the start of engine 2 is requested, warm-up control unit 240 cancels the prohibition or stop of warm-up control of catalytic converter 8.

Traveling-mode control unit 250 exerts control as to whether or not engine 2 is operated during traveling, that is, whether to travel in the EV mode or in the HV mode, based on the accelerator pedal position, vehicle speed, shift position, SOC of power storage device 10 and the like. Traveling-mode control unit 250 generates torque command value TR according to the traveling mode for output to MG-ECU 50. When the traveling mode is in the HV mode, traveling-mode control unit 250 outputs control signal CTL3 to EG-ECU 60. Further, traveling-mode control unit 250 outputs mode signal MD indicative of the traveling mode to warm-up control unit 240.

Although not specifically shown, HV-ECU 70 outputs external charge command EXCG to EG-ECU 50 when power storage device 10 is charged from power source 120 external to the vehicle.

Figure 3:
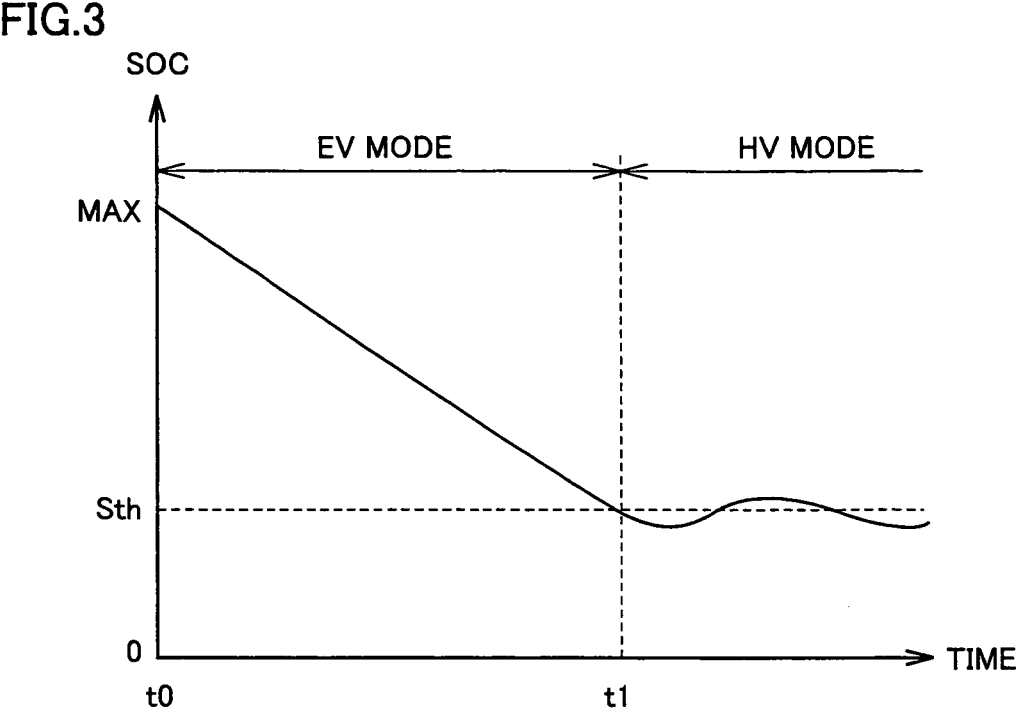
FIG. 3 is a graph showing SOC variations of a power storage device.

FIG. 3 is a graph showing SOC variations of power storage device 10. Referring to FIG. 3, it is supposed that traveling of hybrid vehicle 100 is started at time t0 with power storage device 10 being in a fully-charged state. Performed until the SOC of power storage device 10 falls below a predetermined threshold value Sth at time t1 is the EV traveling of traveling using electric power stored in power storage device 10 with engine 2 turned off. At time t1, when the SOC of power storage device 10 falls below threshold value Sth, engine 2 is started, so that the traveling mode is changed from the EV mode to the HV mode.

When the temperature of power storage device 10 is low, the output of power storage device 10 decreases. Therefore, threshold value Sth may be corrected to be larger in order to ensure power necessary for starting engine 2. Alternatively, when threshold value Sth is relatively large, threshold value Sth may be corrected contrarily to be smaller in order to increase the amount of discharge from power storage device 10 to raise the temperature of power storage device 10. As can be seen from FIG. 3, the traveling distance in the EV mode varies according to threshold value Sth. Therefore, the possible EV-running distance may be corrected at possible-EV-running-distance estimation unit 220 shown in FIG. 2 according to the temperature of power storage device 10.

Figure 4:
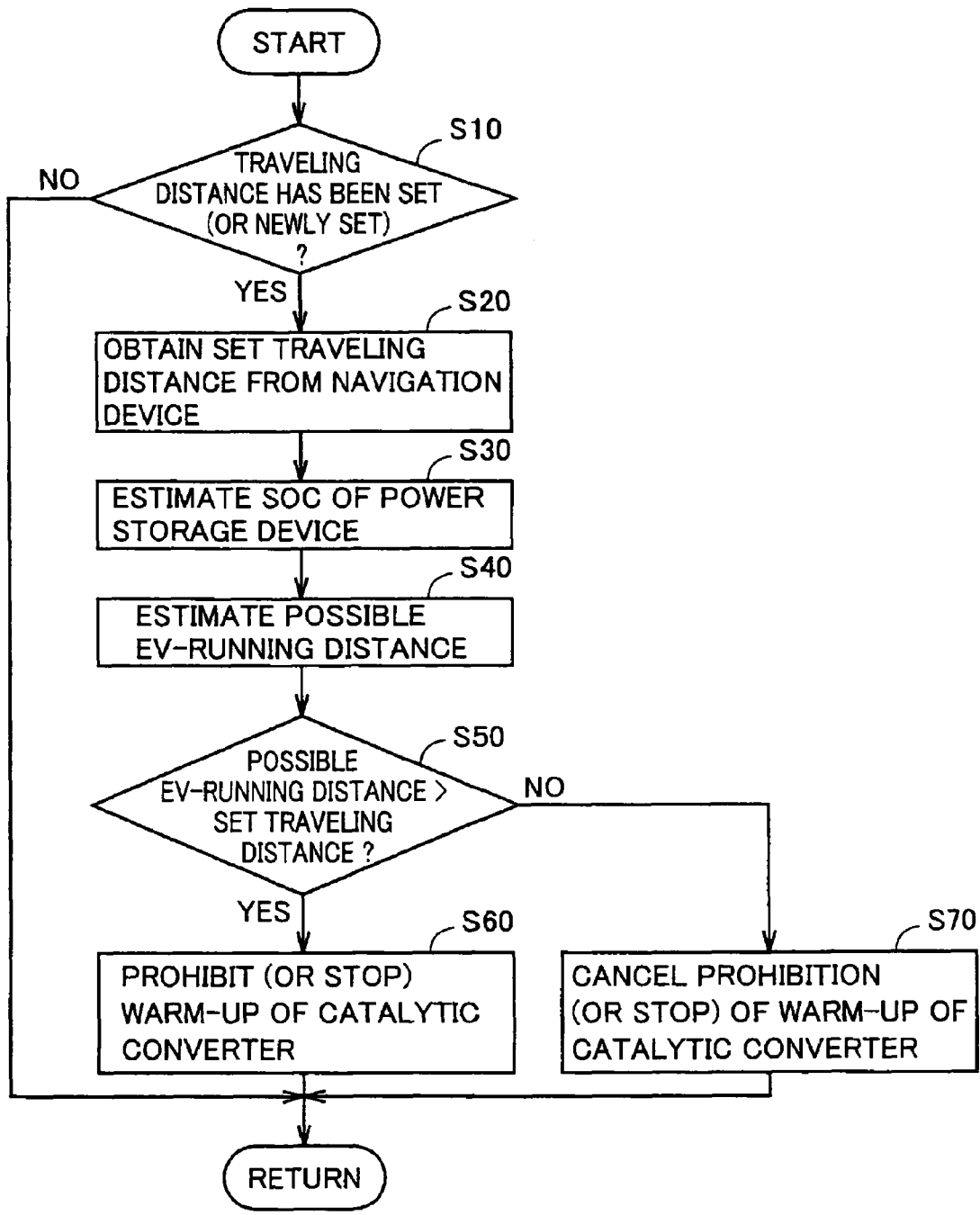
FIG. 4 is a flow chart of warm-up prohibition control of a catalytic converter by the HV-ECU shown in FIG. 1.

FIG. 4 is a flow chart of warm-up prohibition control of catalytic converter 8 exerted by HV-ECU 70 shown in FIG. 1. The process shown in the flow chart is invoked for execution from a main routine at regular time intervals or each time a predetermined condition is met.

Referring to FIG. 4, when informed by navigation device 80 that traveling distance L to a destination has been set (including calculation of traveling distance L based on destination setting) (YES in step S10), HV-ECU 70 obtains set traveling distance L from navigation device 80 (step S20). When traveling distance L has been newly set (or changed), HV-ECU 70 obtains newly set traveling distance L from navigation device 80.

Next, HV-ECU 70 estimates the SOC of power storage device 10 based on detected values of voltage VB and current LB of power storage device 10 (step S30). HV-ECU 70 then estimates a possible running distance in the EV mode based on the estimated SOC (step S40). As described above, the estimated possible EV-running distance may be corrected based on the temperature of power storage device 10.

HV-ECU 70 then determines whether or not the estimated possible EV-running distance is longer than set traveling distance L (step S50). Having determined that the possible EV-running distance is longer than traveling distance L (YES in step S50), HV-ECU 70 determines that warm-up of catalytic converter 8 subject to operation of engine 2 is unnecessary, to instruct prohibition or stop of warm-up of catalytic converter 8 (step S60). More specifically, HV-ECU 70 outputs control signal CTL2 instructing prohibition or stop of warm-up of catalytic converter 8, to EG-ECU 60.

On the other hand, when it is determined that the possible EV-running distance is not longer than traveling distance L (NO in step S50), HV-ECU 70 cancels the prohibition or stop of warm-up of catalytic converter 8 (step S70). More specifically, HV-ECU 70 deactivates control signal CTL2 to EG-ECU 60. Accordingly, when control signal CTL1 is output to EG-ECU 60 at a necessary time (for example, when the SOC of power storage device 10 falls below a predetermined value), engine 2 is started to warm up catalytic converter 8.

When the start of engine 2 is requested during prohibition or stop of warm-up of catalytic converter 8, HV-ECU 70 deactivates control signal CTL2 to cancel the prohibition or stop of warm-up of catalytic converter 8.

After traveling distance L to a destination is set by navigation device 80 and when the vehicle system is turned off at a shorter distance than traveling distance L and the vehicle system is activated again (for example, in the case such as when power storage device 10 is charged from power source 120 external to the vehicle or a rest is taken before reaching the destination), the above control is preferably exerted without requesting the user to set traveling distance L again after the system activation.

Figure 5:
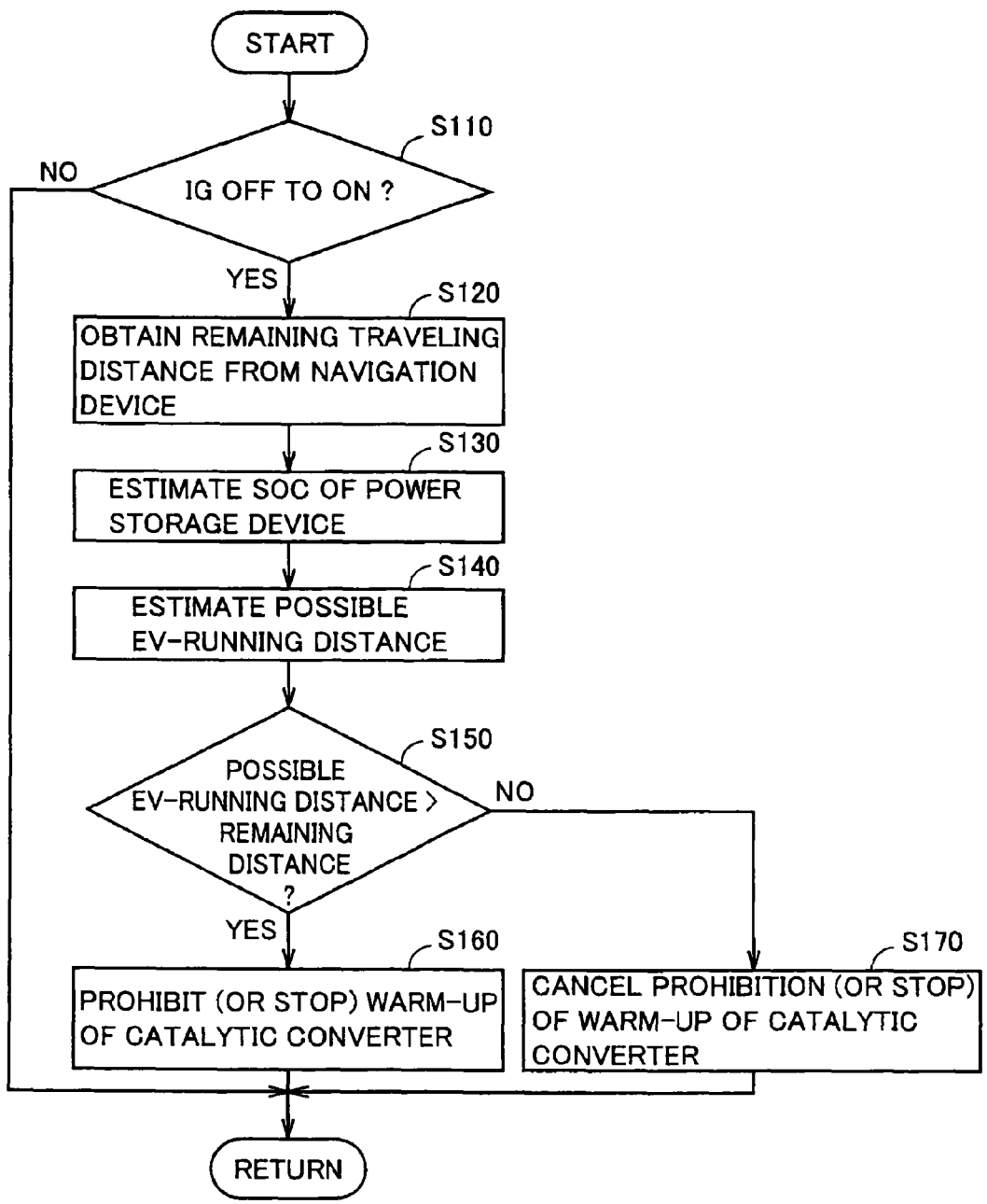
FIG. 5 is a flow chart of warm-up prohibition control of the catalytic converter after system activation.

FIG. 5 is a flow chart of warm-up prohibition control of catalytic converter 8 exerted after the system activation. The process shown in the flow chart is executed only once at a predetermined time after the system activation.

Referring to FIG. 5, HV-ECU 70 determines whether or not signal IG indicative of the activated state of the vehicle system has been changed from OFF to ON (step S110). When it is determined that signal IG has been changed from OFF to ON (YES in step S110), HV-ECU 70 obtains a remaining traveling distance to the destination from navigation device 80 as traveling distance L (step S120).

HV-ECU 70 then advances the process to step S130. Steps S130 to S170 are identical to steps S30 to S70 shown in FIG. 4, respectively.

According to the first embodiment as described above, the possible running distance in the EV mode is estimated based on the SOC of power storage device 10, and the estimated possible EV-running distance is compared with set traveling distance L (for example, a traveling distance to a destination). When the possible EV-running distance is longer than traveling distance L, warm-up control of catalytic converter 8 is prohibited or stopped. Accordingly, the first embodiment can prevent unnecessary warm-up of catalytic converter 8 to avoid increase in fuel consumption.

Further, according to the first embodiment, even when warm-up control of catalytic converter 8 is prohibited or stopped, the prohibition or stop of warm-up of catalytic converter 8 is canceled when start of engine 2 is requested. Accordingly, the first embodiment enables appropriate warm-up of catalytic converter 8 when necessary.

Furthermore, according to the first embodiment, when traveling distance L has been newly set, warm-up prohibition control of catalytic converter 8 is exerted based on newly set traveling distance L. Accordingly, changes of traveling distance L during traveling can also be accommodated.

Still further, according to the first embodiment, when the vehicle system is turned off at a distance shorter than set traveling distance L, warm-up prohibition control of catalytic converter 8 is exerted again next time when the system is activated. This eliminates the need for the user to set traveling distance L again at the activation of the vehicle system.

Second Embodiment

In a second embodiment, when the possible EV-running distance estimated based on the SOC of power storage device 10 is not longer than set traveling distance L, the SOC in which engine 2 is started (hereinafter also referred to as "engine start SOC") is set at a value larger than in the case where the possible EV-running distance is longer than traveling distance L. This ensures necessary power for traveling during catalyst warm-up after the engine is started.

The overall configuration of a hybrid vehicle 100A according to the second embodiment is identical to that of hybrid vehicle 100 shown in FIG. 1 according to the first embodiment.

Figure 6:
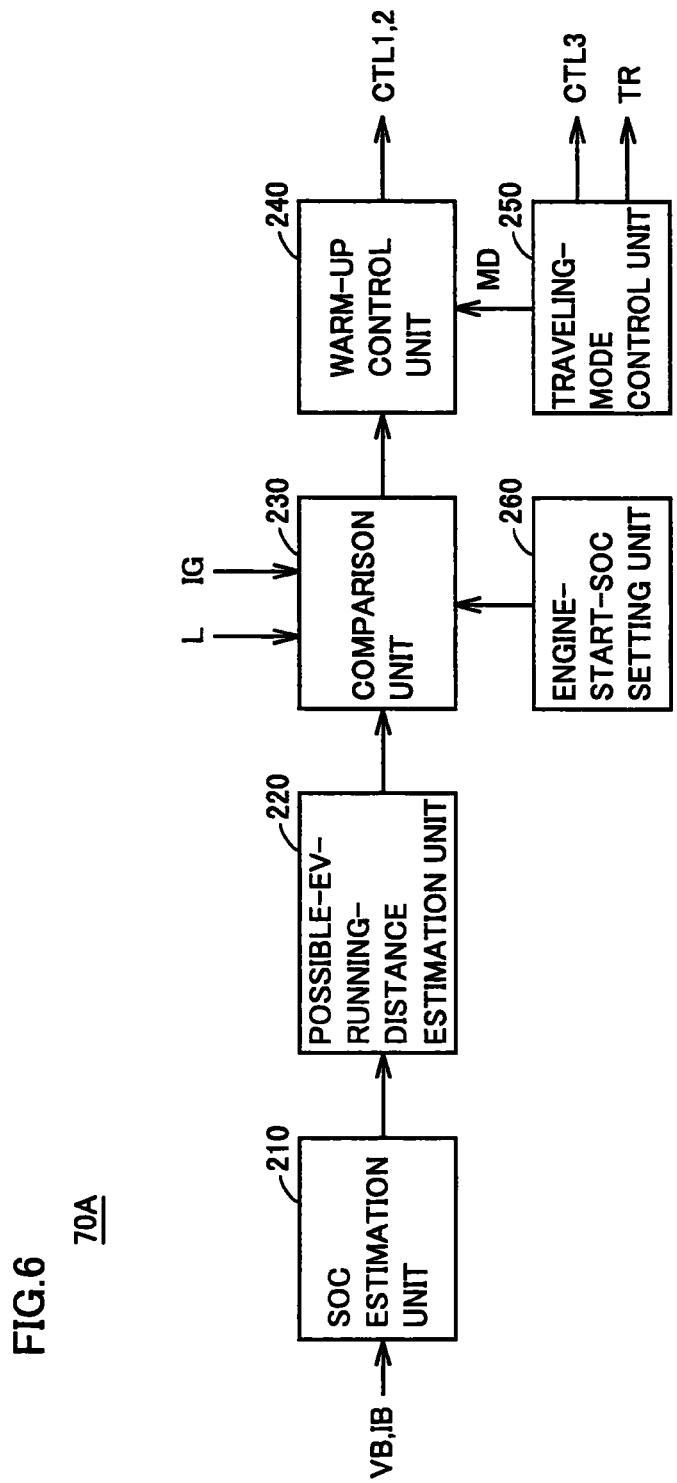
FIG. 6 is a functional block diagram of an HV-ECU according to a second embodiment.

FIG. 6 is a functional block diagram of an HV-ECU 70A according to the second embodiment. Referring to FIG. 6, HV-ECU 70A further includes an engine-start-SOC setting unit 260 in addition to the configuration of HV-ECU 70 shown in FIG. 2 according to the first embodiment.

Engine-start-SOC setting unit 260 sets the above-mentioned engine-start-SOC. More specifically, engine-start-SOC setting unit 260 sets threshold value Sth (FIG. 3) at which the traveling mode is changed from the EV mode to the HV mode. Herein, upon receipt of a result of the comparison that the possible EV-running distance is longer than traveling distance L from comparison unit 230, engine-start-SOC setting unit 260 sets the engine start SOC at a prescribed value SOC1.

Upon receipt of a result of the comparison from comparison unit 230 opposite to the above, engine-start-SOC setting unit 260 sets the engine start SOC at a prescribed value SOC2 which is larger than prescribed value SOC1, for the purpose of ensuring the necessary power for traveling during catalyst warm-up after the engine is started. Traveling-mode control unit 250 then changes the traveling mode using the engine start SOC set by engine-start-SOC setting unit 260.

Figure 7:
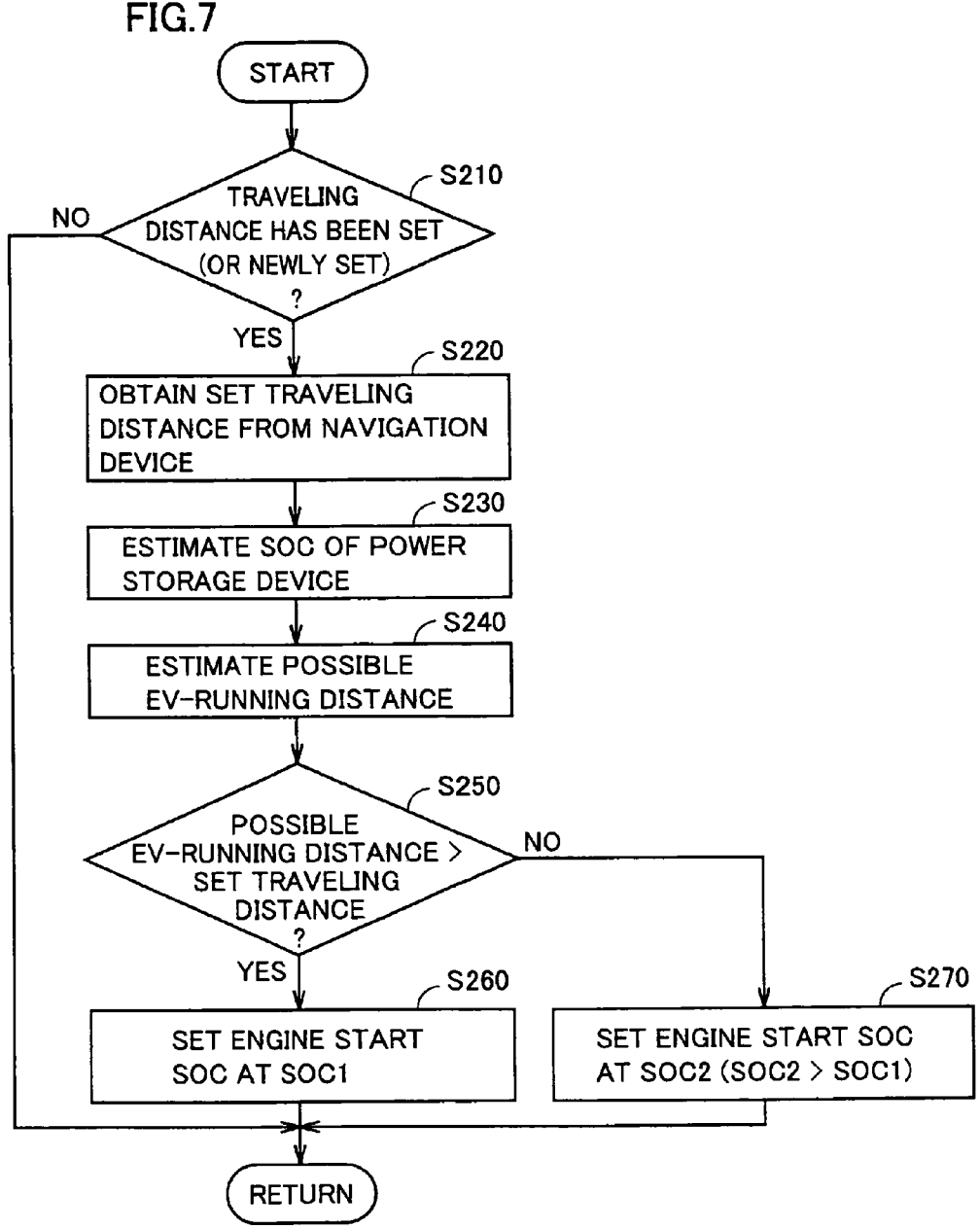
FIG. 7 is a flow chart of setting an engine start SOC by the HV-ECU according to the second embodiment.

FIG. 7 is a flow chart of setting engine start SOC by HV-ECU 70A according to the second embodiment. The process shown in the flow chart is also invoked for execution from a main routine at regular time intervals or each time a predetermined condition is met.

Referring to FIG. 7, steps S210 to S250 are identical to steps S10 to S50 shown in FIG. 4, respectively.

When it is determined in step S250 that the possible EV-running distance is longer than traveling distance L (YES in step S250), HV-ECU 70A sets the engine start SOC at prescribed value SOC1 (step S260). When it is determined in step S250 that the possible EV-running distance is not longer than traveling distance L (NO in step S250), HV-ECU 70A sets the engine start SOC at prescribed value SOC2 which is larger than prescribed value SOC1 (step S270).

The remaining functions of HV-ECU 70A are identical to those of HV-ECU 70 according to the first embodiment.

After traveling distance L to a destination is set by navigation device 80 and when the vehicle system is turned off at a distance shorter than traveling distance L and the vehicle system is activated again, the above-described process is preferably executed without requesting the user to set traveling distance L again after the system activation.

Figure 8:
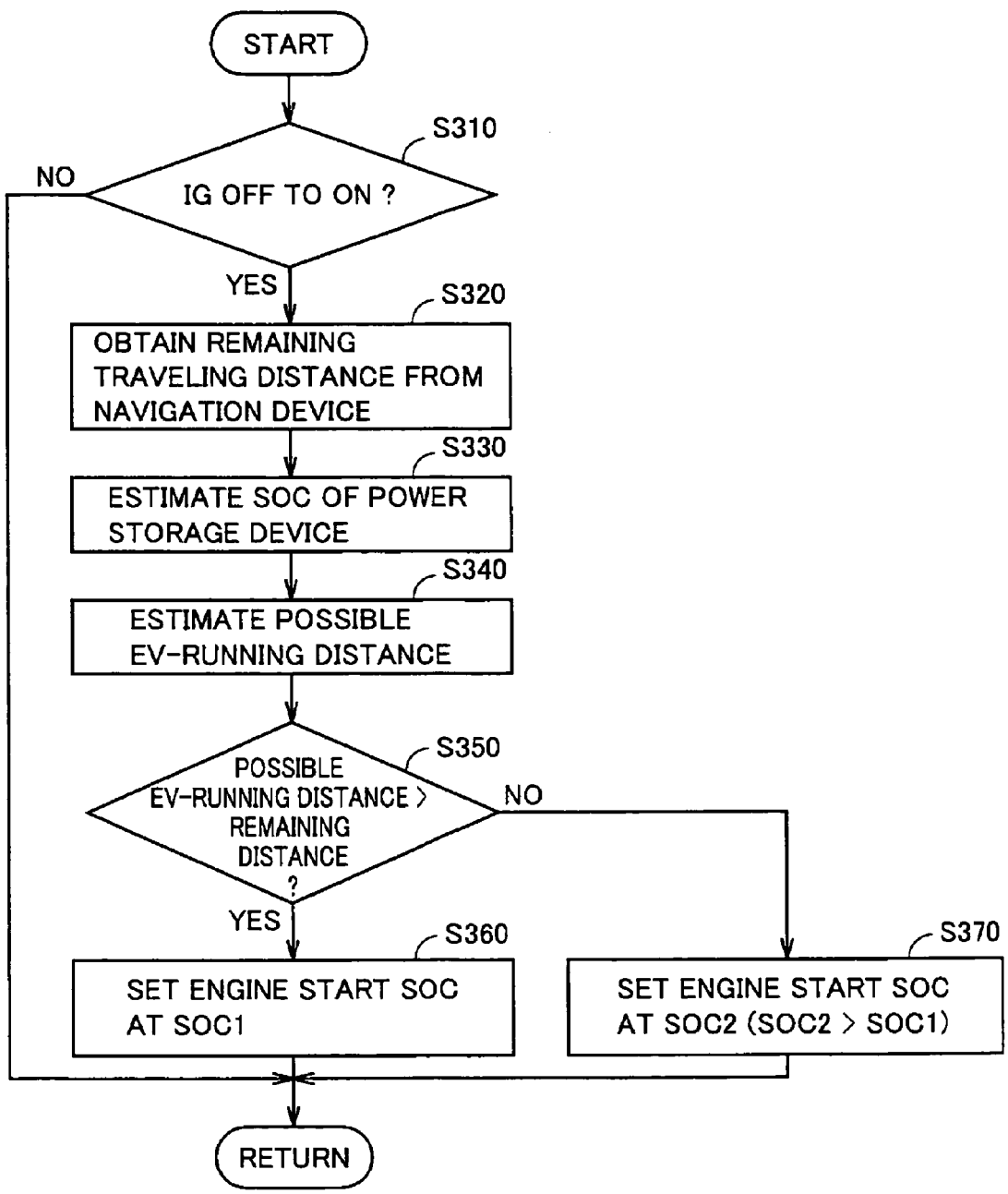
FIG. 8 is a flow chart of setting an engine start SOC executed after system activation.

FIG. 8 is a flow chart of setting the engine start SOC executed after the system activation. The process shown in the flow chart is executed only once at a predetermined time after the system activation.

Referring to FIG. 8, HV-ECU 70A determines whether or not signal IG indicative of the activated state of the vehicle system has been changed from OFF to ON (step S310). When it is determined that signal IG has been changed from OFF to ON (YES in step S310), HV-ECU 70A advances the process to step S320. Step S320 is identical to step S120 shown in FIG. 5, and steps S330 to S370 are identical to steps S230 to S270 shown in FIG. 7, respectively.

According to the second embodiment as described above, when the possible EV-running distance is not longer than traveling distance L, the engine start SOC is set at a value larger than in the case where the possible EV-running distance is longer than traveling distance L. This ensures the necessary power for traveling during catalyst warm-up after the engine is started. In other words, catalytic converter 8 is warmed up reliably. Accordingly, the second embodiment can prevent degradation in the function of catalytic converter 8 of purifying the exhaust gas.

According to the above respective embodiments, when power storage device 10 is charged from power source 120 external to the vehicle, charging power is received at neutral points N1 and N2 of motor generators MG1 and MG2, respectively. Alternatively, an additional inverter dedicated for charging may be provided.

Figure 9:
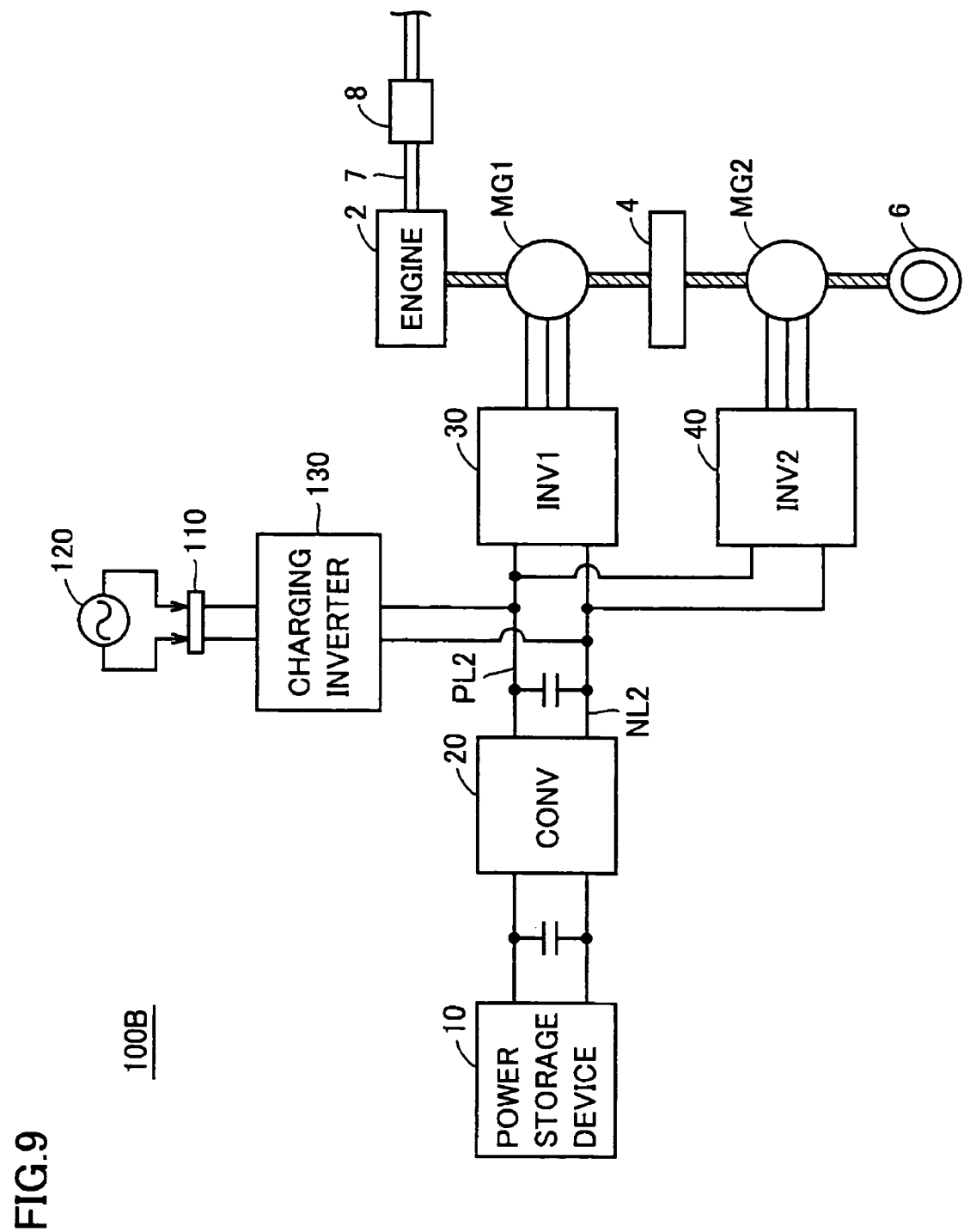
FIG. 9 is an overall block diagram of a hybrid vehicle having an additional charging inverter.

FIG. 9 is an overall block diagram of a hybrid vehicle having an additional charging inverter. Referring to FIG. 9, a hybrid vehicle 100B further includes a charging inverter 130 in addition to the configuration of hybrid vehicle 100 shown in FIG. 1.

Charging inverter 130 is connected to positive electrode line PL2 and negative electrode line NL2 to convert ac power received at connector 110 from power source 120 (e.g., system power source) external to the vehicle into dc power for output to positive electrode line PL2 and negative electrode line NL2.

The dc power supplied from charging inverter 130 to positive electrode line PL2 and negative electrode line NL2 can be converted into a voltage level of power storage device 10 by boost converter 20 to charge power storage device 10.

The remaining configuration of hybrid vehicle 100B is identical to that of hybrid vehicle 100. It should be noted that the respective ECUs are not shown in FIG. 9.

Although the above embodiments have each described a hybrid vehicle whose power storage device 10 is rechargeable from power source 120 external to the vehicle, the application range of the present invention is not limited to hybrid vehicles having such externally-rechargeable function. It should be noted that, however, since vehicles having the externally-rechargeable function can travel a long distance (e.g., 10 km or longer) in the EV mode starting from a fully-charged state of power storage device 10, warm-up of catalytic converter 8 subject to operation of engine 2 is unnecessary in many occasions for a user who tends to use the vehicle for short distance traveling. Accordingly, the present invention is particularly suitable for hybrid vehicles having the externally-rechargeable function.

It has been described above that the destination is set at navigation device 80 to calculate traveling distance L from the current position to the destination. Alternatively, navigation device 80 may be replaced by an input device allowing the user to directly input traveling distance L. In this alternative, calculation of traveling distance L to the destination at the system activation can be performed by storing an actually-traveled distance since the traveling distance has been set by the user, and subtracting the actually-traveled distance from the traveling distance set by the user, to obtain a remaining traveling distance as a traveling distance to the destination at the system activation.

Alternatively, traveling distance L may be set at a preset fixed value. In this alternative, when the amount of charge of power storage device 10 is large at the system activation, warm-up control of catalytic converter 8 at the system activation can be prohibited.

It has been described above that warm-up prohibition control of catalytic converter 8 and setting of the engine start SOC are performed when the destination is set at navigation device 80 or when the system is turned off/activated before reaching the destination. Alternatively, the aforementioned warm-up prohibition control and setting of the engine start SOC may be performed at regular intervals or at every predetermined distance traveled.

Further, it has been described above that catalytic converter 8 is warmed up by the heat of exhaust gas from engine 2. Alternatively, a heater for warming up catalytic converter 8 may be provided to warm up catalytic converter 8. This alternative can also prevent unnecessary warm-up of catalytic converter 8 to thereby avoid unnecessary power consumption. As a result, increase in fuel consumption can be prevented.

Furthermore, hybrid vehicles described above are of the series/parallel type in which the motive power of engine 2 can be split by power split mechanism 4 for transmission to an axle and motor generator MG1. However, the present invention is also applicable to the so-called series type hybrid vehicle in which engine 2 is used only for driving motor generator MG1 and the driving force for the vehicle is produced only by means of motor generator MG2.

In such a series type hybrid vehicle, the EV traveling with the engine turned off is started with the power storage device being in the fully-charged state. When the SOC of the power storage device drops to a predetermined threshold value, the engine is started to drive the power generator, following which the EV traveling is performed with power generated by the engine.

In the foregoing, engine 2 corresponds to "an internal combustion engine", and motor generator MG2 corresponds to "an electric motor", according to the present invention. Engine 2 and EG-ECU 60 constitute "a warming-up unit", and navigation device 80 corresponds to "a setting unit", according to the present invention. Possible-EV-running-distance estimation unit 220 corresponds to "an estimation unit", and warm-up control unit 240 corresponds to "a control unit", according to the present invention.

Engine-start-SOC setting unit 260 corresponds to "a threshold-value setting unit" according to the present invention. Inverters 30 and 40, motor generators MG1 and MG2, electric power lines ACL1 and ACL2, and connector 110 constitute "a charging unit" according to the present invention. Charging inverter 130 and connector 110 also constitute the "charging unit" according to the present invention.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

The invention claimed is:

1. A hybrid vehicle equipped with an internal combustion engine, an electric motor serving as a power source for driving the hybrid vehicle and a power storage device supplying electric power to the electric motor, comprising:
    a catalytic converter purifying an exhaust gas discharged from the internal combustion engine;
    a warming-up unit configured to warm up the catalytic converter by retarding opening and closing timing of an intake valve of the internal combustion engine after starting the internal combustion engine;
    a setting unit configured to set a traveling distance of the hybrid vehicle;
    an estimation unit configured to estimate a possible running distance in an electric-motor traveling mode of traveling with the internal combustion engine turned off and with the electric motor driven, based on a state of charge of the power storage device;
    a comparison unit configured to compare the possible running distance estimated by the estimation unit with the traveling distance set by the setting unit; and
    a power generation unit configured to generate electric power to charge the power storage device by motive power of the internal combustion engine, wherein
    the hybrid vehicle switches from the electric-motor traveling mode to a hybrid vehicle mode by starting the internal combustion engine when a state of charge of the power storage device falls below a predetermined threshold value,
    the hybrid vehicle further including a threshold value setting unit for setting the predetermined threshold value at a first threshold value when the possible running distance estimated by the estimation unit is longer than the traveling distance set by the setting unit, and setting the predetermined threshold value at a second threshold value, larger than the first threshold value by an amount necessary for traveling while the catalytic converter is warmed up by the warming up unit when the possible running distance estimated by the estimation unit is not longer than the traveling distance set by the setting unit.

2. The hybrid vehicle according to claim 1 further comprising:
    a control unit configured to control the warming-up unit based on a result of the comparison made by the comparison unit, wherein when the possible running distance estimated by the estimation unit is longer than the traveling distance set by the setting unit, the control unit prohibits warm-up of the catalytic converter by the warming-up unit.

3. The hybrid vehicle according to claim 2, wherein when start of the internal combustion engine is requested during prohibition of warm-up of the catalytic converter, the control unit cancels the prohibition of warm-up of the catalytic converter by the warming-up unit.

4. The hybrid vehicle according to claim 1, wherein when the traveling distance of the hybrid vehicle is newly set by the setting unit, the comparison unit compares the newly set traveling distance with the possible running distance estimated by the estimation unit, and the control unit controls the warming-up unit based on the result of the comparison.

5. The hybrid vehicle according to claim 1, wherein when the traveling distance of the hybrid vehicle is newly set by the setting unit during warm-up of the catalytic converter by the warming-up unit, the comparison unit compares the newly set traveling distance with the possible running distance estimated by the estimation unit, and when the possible running distance estimated by the estimation unit is longer than the newly set traveling distance, the control unit stops warm-up of the catalytic converter by the warming-up unit.

6. The hybrid vehicle according to claim 1, wherein when the hybrid vehicle is turned off at a distance shorter than the traveling distance set by the setting unit, the comparison unit compares a remaining distance of the set traveling distance with the possible running distance estimated by the estimation unit when the hybrid vehicle is turned on subsequent to having been turned off at a distance shorter than the traveling distance, and the control unit controls the warming-up unit based on the result of the comparison.

7. The hybrid vehicle according to claim 1, further comprising:
a charging unit configured to charge the power storage device by electric power received from a source external to the hybrid vehicle.

8. The hybrid vehicle according to claim 1, wherein the setting unit includes a navigation device configured to set a destination of the hybrid vehicle, and the navigation device calculates the traveling distance of the hybrid vehicle based on the set destination.

9. The hybrid vehicle according to claim 1, wherein the setting unit includes an input device allowing input of the traveling distance of the hybrid vehicle.

10. The hybrid vehicle according to claim 1, wherein the setting unit sets the traveling distance of the hybrid vehicle at a preset fixed value.

11. A method of controlling a hybrid vehicle equipped with an internal combustion engine, an electric motor serving as a power source for driving the hybrid vehicle and a power storage device supplying electric power to the electric motor, wherein
the hybrid vehicle includes:
a catalytic converter purifying an exhaust gas discharged from the internal combustion engine; and
a warming-up device configured to warm up the catalytic converter by retarding opening and closing timing of an intake valve of the internal combustion engine after starting the internal combustion engine, and
a power generation device configured to generate electric power to charge the power storage device by motive power of the internal combustion engine, wherein
the hybrid vehicle switches from the electric-motor traveling mode to a hybrid vehicle mode by starting the internal combustion engine when a state of charge of the power storage device falls below a predetermined threshold value,
the method comprising:
a first step of setting a traveling distance of the hybrid vehicle;
a second step of estimating a state of charge of the power storage device;
a third step of estimating a possible running distance in an electric-motor traveling mode of traveling with the internal combustion engine turned off and with the electric motor driven, based on the estimated state of charge;
a fourth step of comparing the estimated possible running distance with the traveling distance set in the first step; and
a fifth step of setting the predetermined threshold value at a first threshold value when the possible running distance estimated in the third step is longer than the traveling distance set in the first step; and
a sixth step of setting the predetermined threshold value at a second threshold value larger than the first threshold value by an amount necessary for traveling while the catalytic converter is warmed up by the warming up device, when the possible running distance estimated in the third step is not longer than the traveling distance set in the first step.

12. A hybrid vehicle equipped with an internal combustion engine, an electric motor serving as a power source for driving the hybrid vehicle and a power storage device supplying electric power to the electric motor, comprising:
a catalytic converter purifying an exhaust gas discharged from the internal combustion engine;
a warming-up device warming up the catalytic converter by retarding opening and closing timing of an intake valve of the internal combustion engine after starting the internal combustion engine;
a setting device setting a traveling distance of the hybrid vehicle;
a power generation device generating electric power for charging the power storage device by motive power of the internal combustion engine, and
a control device executing a series of steps, wherein
the hybrid vehicle switches from the electric-motor traveling mode to a hybrid vehicle mode by starting the internal combustion engine when a state of charge of the power storage device falls below a predetermined threshold value, and
the control device estimates a possible running distance in an electric-motor traveling mode of traveling with the internal combustion engine turned off and with the electric motor driven, based on a state of charge of the power storage device, compares the estimated possible running distance with the traveling distance set by the setting device, controls the warming-up device based on a result of the comparison, and sets the predetermined threshold value at a first threshold value when the estimated possible running distance is longer than the traveling distance set by the setting device, and sets the predetermined threshold value at a second threshold value larger than the first threshold value by an amount necessary for traveling while the catalytic converter is warmed up by the warming up device when the estimated possible running distance is not longer than the traveling distance set by the setting device.

13. The hybrid vehicle according to claim 12, wherein when the estimated possible running distance is longer than the traveling distance set by the setting device, the control device prohibits warm-up of the catalytic converter by the warming-up device.

14. The hybrid vehicle according to claim 13, wherein when start of the internal combustion engine is requested during prohibition of warm-up of the catalytic converter, the control device cancels the prohibition of warm-up of the catalytic converter by the warming-up device.

15. The hybrid vehicle according to claim 12, wherein when the traveling distance of the hybrid vehicle is newly set by the setting device, the control device compares the newly set traveling distance with the estimated possible running distance, and controls the warming-up device based on the result of the comparison.

16. The hybrid vehicle according to claim 12, wherein when the traveling distance of the hybrid vehicle is newly set by the setting device during warm-up of the catalytic converter by the warming-up device, the control device compares the newly set traveling distance with the estimated possible running distance, and when the estimated possible running distance is longer than the newly set traveling distance, the control device stops the warm-up of the catalytic converter by the warming-up device.

17. The hybrid vehicle according to claim 12, wherein when the hybrid vehicle is turned off at a distance shorter than the traveling distance set by the setting device, the control device compares a remaining distance of the set traveling distance with the estimated possible running distance when the hybrid vehicle is turned on subsequent to having been turned off at a distance shorter than the traveling distance, and controls the warming-up device based on the result of the comparison.

18. The hybrid vehicle according to claim 12, further comprising a charging device charging the power storage device by electric power received from a source external to the hybrid vehicle.

19. The hybrid vehicle according to claim 12, wherein
the setting device includes a navigation device allowing setting of a destination of the hybrid vehicle, and
the navigation device calculates the traveling distance of the hybrid vehicle based on the set destination.

20. The hybrid vehicle according to claim 12, wherein
the setting device includes an input device allowing input of the traveling distance of the hybrid vehicle.

21. The hybrid vehicle according to claim 12, wherein
the setting device sets the traveling distance of the hybrid vehicle at a preset fixed value.

\* \* \* \* \*